L. D. McJILTON.
AUTOMOBILE LOCK.
APPLICATION FILED JULY 8, 1918.

1,356,079.

Patented Oct. 19, 1920.

INVENTOR.
Lee D. McJilton.
BY Hazard & Miller
ATTORNEY.

UNITED STATES PATENT OFFICE.

LEE D. McJILTON, OF LOS ANGELES, CALIFORNIA.

AUTOMOBILE-LOCK.

1,356,079.  Specification of Letters Patent.  Patented Oct. 19, 1920.

Application filed July 8, 1918. Serial No. 243,855.

*To all whom it may concern:*

Be it known that I, LEE D. McJILTON, a citizen of the United States, residing at Los Angeles, in the county of Los Angeles and State of California, have invented new and useful Improvements in Automobile-Locks, of which the following is a specification.

My invention relates to automobile locks and consists of the novel features herein shown, described and claimed.

Figure 1:
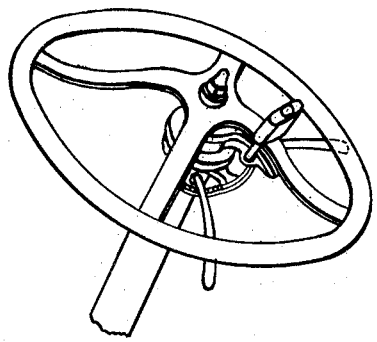
Figure 1 is a perspective of an automobile steering wheel provided with a lock embodying the principles of my invention.
Figure 2:
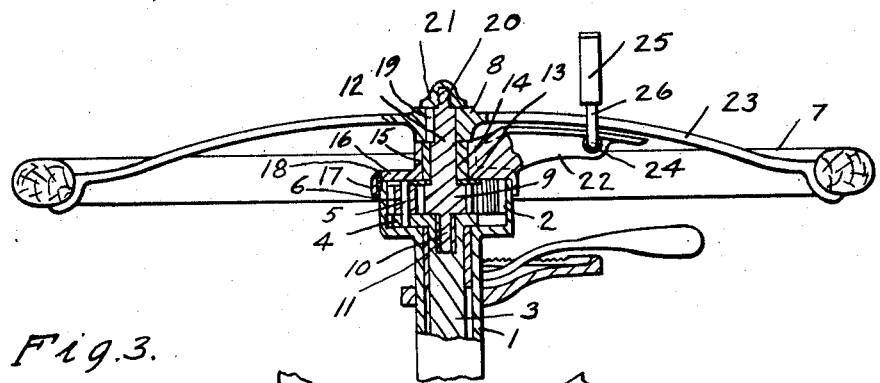
Fig. 2 is a vertical diametrical sectional detail through the steering wheel and lock construction.
Figure 3:
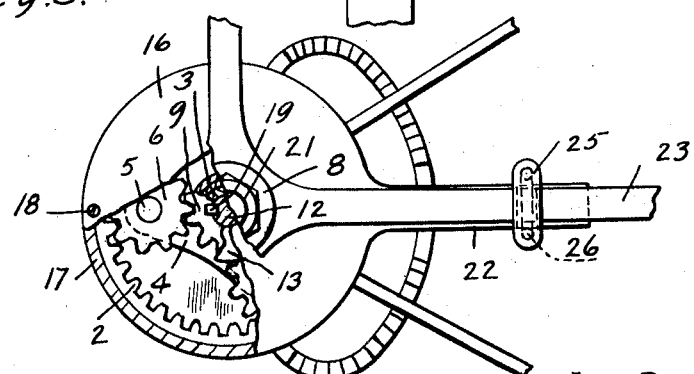
Fig. 3 is a fragmentary plan of the steering wheel, parts being broken away and shown in section to show the lock construction.

The steering post casing 1 has an internal gear 2 fixed to and extending upwardly from its upper end. The steering post shaft 3 is rotatably mounted in the steering post casing 1 and has a spider 4 fixed to its upper end within the chamber formed by the internal gear 2. Stub-shafts 5 are fixed in the spider 4 and idler pinions 6 are mounted upon the stub-shafts in mesh with the internal gear 2.

The steering wheel 7 has a central hub 8. A driving pinion 9 has a pintle 10 extending loosely into the end of the steering post shaft 3, there being a bushing 11 around the pintle, so as to mount the driving pinion 9 centrally upon the spider 4 in mesh with the spur pinion 6. A stub-shaft 12 extends axially from the driving pinion 9 in line with the pintle 10 and at the opposite side of the pinion. A washer 13 is inserted downwardly around the stub-shaft 12 against the side of the driving pinion 9, said washer extending outwardly beyond the teeth of the pinion. A spacing sleeve 14 is inserted downwardly upon the stub-shaft 12 against the washer 13. A locking cap hub 15 is inserted downwardly around the sleeve 14 against the washer 13. A locking cap plate 16 is formed integral with the hub 15 and has a flange 17 screwed upon the internal gear 2 and a pin 18 is inserted through the cap plate to engage the internal gear and hold the cap plate rigidly in place. The hub 8 fits upon the stub-shaft 12 against the spacing sleeve 14 and is held non-rotatably in place by a key 19. A screw-threaded nipple 20 extends from the upper end of the stub-shaft 12 and a cap nut 21 is screwed upon the nipple against the hub 8.

The stub-shaft 12 is thus made rigid with the steering wheel 7 and rotates freely relative to the hub 15; the spacing sleeve 14 and the washer 13 being pinched between the hub 8 and the driving pinion 9.

A locking arm 22 is formed integral with the hub 15 and cap plate 16 and extends outwardly under the spokes 23 of the steering wheel, said locking arm having an opening 24 near its outer end.

It is obvious that when the steering wheel 7 is manually rotated the steering post shaft 3 will be rotated at a slower rate of speed through the gear train formed by the driving pinion 9, the idler pinions 6, and the internal gear 2.

When it is desired to lock the automobile so that it cannot be operated, a padlock 25 is applied, the hasp 26 of the padlock passing through the opening 24 and embracing one of the spokes 23, so that the steering wheel cannot be rotated to operate the automobile.

It is obvious that the arm 22 is at all times rigid with the steering post casing 1 and that when the steering wheel 7 is locked to this arm the automobile cannot be guided.

Various changes may be made in the details of construction without departing from the spirit of my invention as claimed.

I claim:

The combination with a steering post casing having an enlargement at its upper end, of a steering post shaft projecting beyond said enlargement, a steering wheel having spokes fixed upon said shaft, a cap for said enlargement and fixed thereto beneath said steering wheel, an arm extending radially from the cap close under the spokes of the steering wheel and having an opening near its outer end, and means for locking the arm to one of the spokes, said means comprising a padlock having a hasp adapted to pass through the opening in the outer end of the arm and embrace one of the spokes of the steering wheel.

In testimony whereof I have signed my name to this specification.

L. D. McJILTON.